United States Patent
Rockwood

(10) Patent No.: US 6,367,807 B1
(45) Date of Patent: Apr. 9, 2002

(54) LABYRINTH SEAL ASSEMBLY

(75) Inventor: Robert E. Rockwood, Windham, NH (US)

(73) Assignee: Environamics Corporation, Hudson, NH (US)

( * ) Notice: Subject to any disclaimer, the term of this patent is extended or adjusted under 35 U.S.C. 154(b) by 0 days.

(21) Appl. No.: 09/175,092

(22) Filed: Oct. 19, 1998

(51) Int. Cl.[7] .............................................. F16J 15/447
(52) U.S. Cl. ....................... 277/412; 277/421; 277/418
(58) Field of Search ................................. 277/412, 418, 277/421, 428, 429, 348

(56) References Cited

U.S. PATENT DOCUMENTS

| | | | | |
|---|---|---|---|---|
| 4,152,092 A | * | 5/1979 | Swearingen | 415/58.2 |
| 4,743,034 A | * | 5/1988 | Kakabaker et al. | 277/420 |
| 4,890,941 A | * | 1/1990 | Calafell, II et al. | 277/347 |
| 5,024,451 A | * | 6/1991 | Borowski | 277/412 |
| 5,316,317 A | * | 5/1994 | Fedorovich et al. | 29/888.3 |
| 5,368,313 A | * | 11/1994 | Hudson | 277/422 |
| 5,431,414 A | | 7/1995 | Fedorovich et al. | 277/429 |
| 5,494,299 A | | 2/1996 | Rockwood | 277/364 |
| 5,522,601 A | | 6/1996 | Murphy | 277/421 |
| 5,553,867 A | | 9/1996 | Rockwood | 277/348 |
| 5,727,792 A | | 3/1998 | Rockwood | 277/364 |
| 5,772,396 A | | 6/1998 | Rockwood | 415/112 |
| 6,017,037 A | * | 1/2000 | Fedorovich | 277/419 |

* cited by examiner

Primary Examiner—Anthony Knight
(74) Attorney, Agent, or Firm—Liniak, Berenato, Longacre & White

(57) ABSTRACT

A labyrinth seal for use in a centrifugal pump. The seal may eliminate rotating surfaces from rubbing directly against groove surfaces during installation thereby eliminating or reducing the scraping of material from rotating surfaces. Therefore, generation of fine powder from such scraping is reduced or substantially eliminated. A stationary covering is provided over the outer surface or periphery of a rotating member in order to make maintenance personnel less susceptible to injury. No heat process is required for assembly (although some may be used in certain embodiments). A radial trap system is provided for enhancing performance of the seal, including a recess or cutout in the face of a stationary member.

5 Claims, 3 Drawing Sheets

LABYRINTH SEAL ASSEMBLY

This invention relates to a labyrinth seal system for use in a centrifugal chemical processing pump or the like. More particularly, this invention relates to a labyrinth seal system including a rotating rotor driven by a pump shaft and an associated stationary stator.

BACKGROUND OF THE INVENTION

In machines such as centrifugal pumps with rotating shafts, it is frequently necessary to obtain an effective seal between the rotating shaft and stationary element(s) of the machine. Rotating shaft seals may find particular application in bearing housings to prevent lubricants, used to lubricate bearing elements such as ball and thrust bearings, from leaking out of the housing. Another function of rotating shaft seals for bearing housings is to prevent contaminants, such as dirt, dust, water, pump leakage, and condensation, from entering the bearing housing.

The entrance of contaminants into a bearing housing can pose a threat to lubricating fluid therein. Should contaminants enter a bearing housing, lubrication of the bearings by the lubricating fluid (e.g. oil) can be substantially impaired. A loss of lubrication may cause bearings to operate at excessive temperatures, which can lead to premature failure of bearings and subsequent failure of the pump or other device that the bearing housing is incorporated into.

The escape of lubricants from a bearing housing through shaft seals is capable of causing similar problems. Frequent servicing may be required to replace escaping lubricants. Additionally, leakage of lubricating fluid from the bearing housing may cause an inadequate amount of lubricating fluid to remain in the housing such that excessive wear will take place on bearings and other components therein, and eventually leading to premature bearing failure.

One type of sealing device used to provide a seal about rotating shafts and particularly about shafts extending through bearing housings are mechanical labyrinth seals. Such seals commonly incorporate a rotating element or rotor and a stationary element or stator. In certain types of labyrinth seal, opposing faces of the stator and rotor are configured to form a maze or labyrinth flow along an interface between the rotor and stator. Opposing faces are machined to a tight tolerance so that the separation or gap between the opposing faces of the rotor and stator is narrow. The labyrinth path created by the labyrinth sealing element's narrow separation inhibits the leakage of lubricants between the rotating rotor and stationary stator, and thus prevents them from leaving or passing through the seal. Similarly, the labyrinth inhibits the entrance of contaminants into a bearing housing or other structure through the rotor/stator created labyrinth. Exemplary labyrinth seals are disclosed, for example, in U.S. Pat. Nos. 5,316,317; 5,431,414; and 5,522,601, the disclosures of which are all hereby incorporated herein by reference.

The seals of the '601 and '414 patents have a rotating member which extends all the way to the outer extremities of the sealing device. Unfortunately, this makes it easy for maintenance personnel to accidently touch the rotating portion of the labyrinth seal and become injured. This, of course, is a disadvantage associated with the seals of these prior art patents.

Additionally, the seals of both the '601 and '414 patents incorporate a drain groove cut into the face of the stationary member. During assembly and installation, the rotating member is pushed up against the surface that this groove is recessed into. During initial wear-in of the seal, this groove in the surface scrapes away material from the surface of the rotating member and the removed material emerges as a fine dust. Some of this dust may be flung from the seal as it rotates, and additionally, some of the dust has been found to occasionally enter the internals of the equipment that is intended to be protected. This fine dust powder mixes with the oil and creates a mud-like slurry which contaminates the very oil or other lubricating fluid that it is intended to protect from contamination. These, of course, are serious disadvantages with the seals of the '601 and '414 patents.

As can be seen from the above, there exists a need in the art for an improved labyrinth type seal for protecting bearing housings or other structures from contamination.

It is a purpose of this invention to fulfill the above-described needs in the art, as well as other needs apparent to the skilled artisan from the following detailed description of this invention.

SUMMARY OF THE INVENTION

An object of this invention is to provide an improved labyrinth seal for use in centrifugal pumps and other mechanical equipment.

Another object of this invention is to provide a labyrinth seal which eliminates rotating surfaces from rubbing directly against grooved surfaces thereby eliminating the scraping of material from rotating surfaces. Generation of fine powder from such scraping is thus reduced or even substantially eliminated.

Another object of this invention is to provide a labyrinth seal design which incorporates a stationary covering over the outer surface of the rotating member making maintenance personnel less susceptible to injury.

Yet another object of this invention is to provide a labyrinth seal design which does not require a heat process for assembly, and thus allows for reduced manufacturing costs and less potential complications.

Still another object of this invention is to provide a labyrinth seal which includes an annular radial trap groove-type system which enhances performance of the seal. This radial trap may be an annular groove between the rotating and stationary members. A portion of this groove (e.g. half) may be formed by a recess or cutout in the face of the stationary member and the other portion of the groove may be formed by an opposite recess or cutout in the face of the rotating member. Contamination which traverses radially inward through the tight clearance between these parts will enter this groove area. Since the groove area is of wider clearance, the path of least resistance for the contamination becomes this groove which directs the contamination circumferentially around the shaft to a position (e.g. six o'clock position) where it simply drains back out of the assembly via a drainage cutout or notch.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
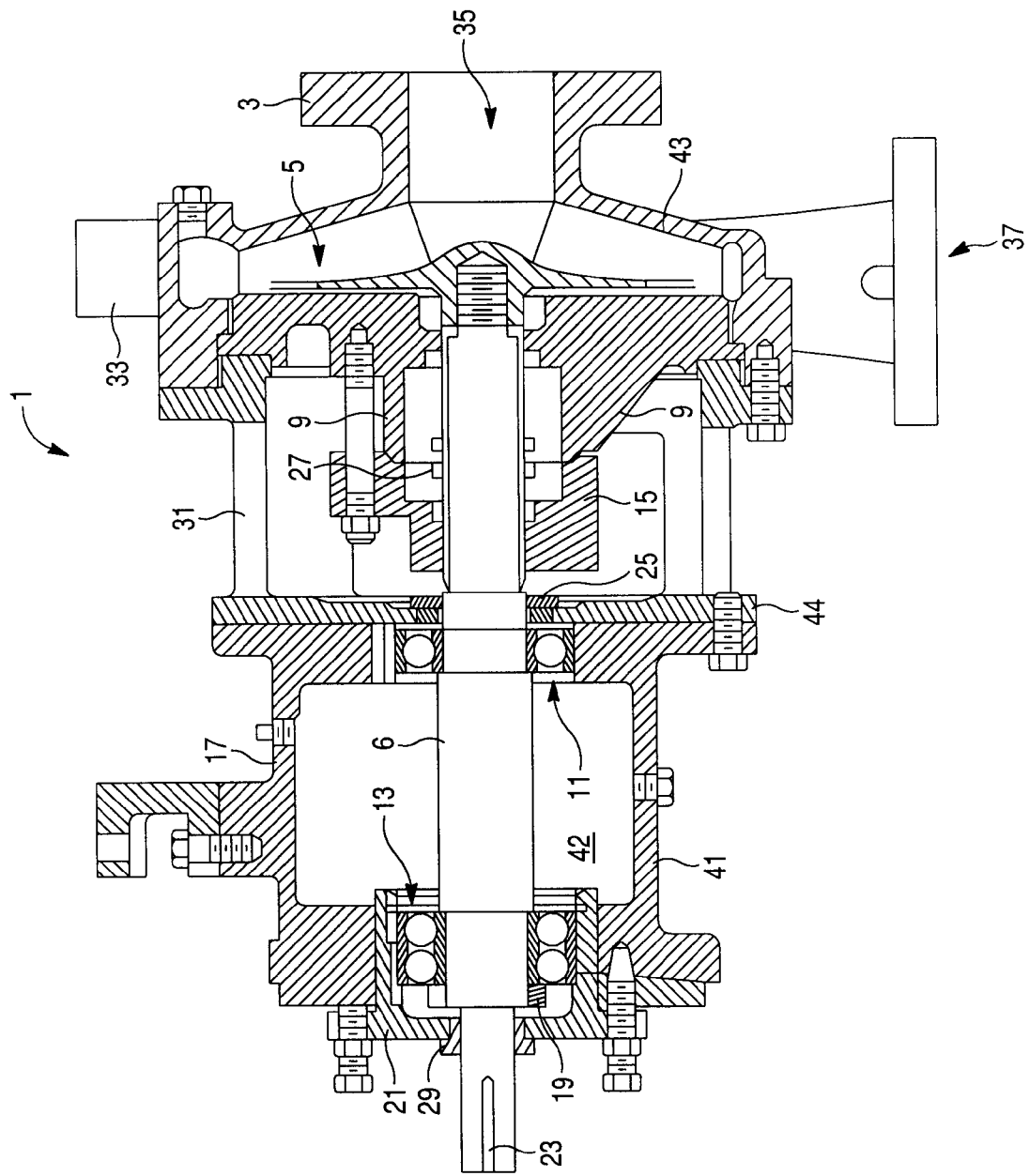
FIG. 1 is a partial cross section of a pump having a bearing housing which incorporates a labyrinth sealing assembly (FIGS. 2–3) in accordance with an embodiment of this invention.

Referring more particularly to the accompanying drawings, in which like reference numerals indicate like parts throughout the several views.

FIG. 1 illustrates a centrifugal chemical processing pump 1. Pump 1 includes casing 3, impeller 5, rotating pump shaft 6, annular stationary member (back cover/stuffing box) 9, inboard or radial ball bearings 11, outboard or rearward thrust ball bearings 13, annular seal gland 15, pump frame 17 including bearing housing 41, outboard bearing locknut 19, annular outboard bearing cover 21, pump shaft coupling key 23, labyrinth seal assembly 25, mechanical seal 27, labyrinth seal assembly 29, adapter 31, and mounting member 33. Pump 1 in FIG. 1 is illustrated in an inverted position for consistency of viewing. A labyrinth seal assembly 25, 29 may be provided on only one or both sides of bearing housing 41 which houses bearing lubricating fluid in chamber 42.

Pump 1 further includes a motor (not shown) affixed to shaft 6 by way of coupling key 23. The motor functions to drive shaft 6 thereby rotating impeller 5 so as to pump fluid between inlet 35 and outlet 37 thereby defining a centrifugal pump.

In pump 1, bearing housing 41 is boltingly attached to forward or frame adaptor 44. Within impeller housing 43 is the impeller 5 and the other illustrated components which were previously discussed. Bearing housing 41 positions a forward radial bearing 11 and rearward thrust bearing 13. These bearings rotatably support pump shaft 6. Rearward thrust bearing 13 compensates for axial thrust loads exerted on shaft 6 by rotation of the impeller.

Lubricating fluid such as oil is contained within bearing housing 41 to lubricate the radial bearing 11 and thrust bearing 13. To prevent leakage of this fluid from stationary bearing housing 41 along shaft 6, the pump includes forward labyrinth seal assembly 25 and/or rearward labyrinth seal assembly 29 (which are illustrated simplistically in FIG. 1 but which will be illustrated and discussed in more detail with reference to FIGS. 2–3) according to certain embodiments of this invention. Labyrinth seals 25 and 29 may both be of the type illustrated and described below with respect to FIGS. 2–3.

Figure 2:
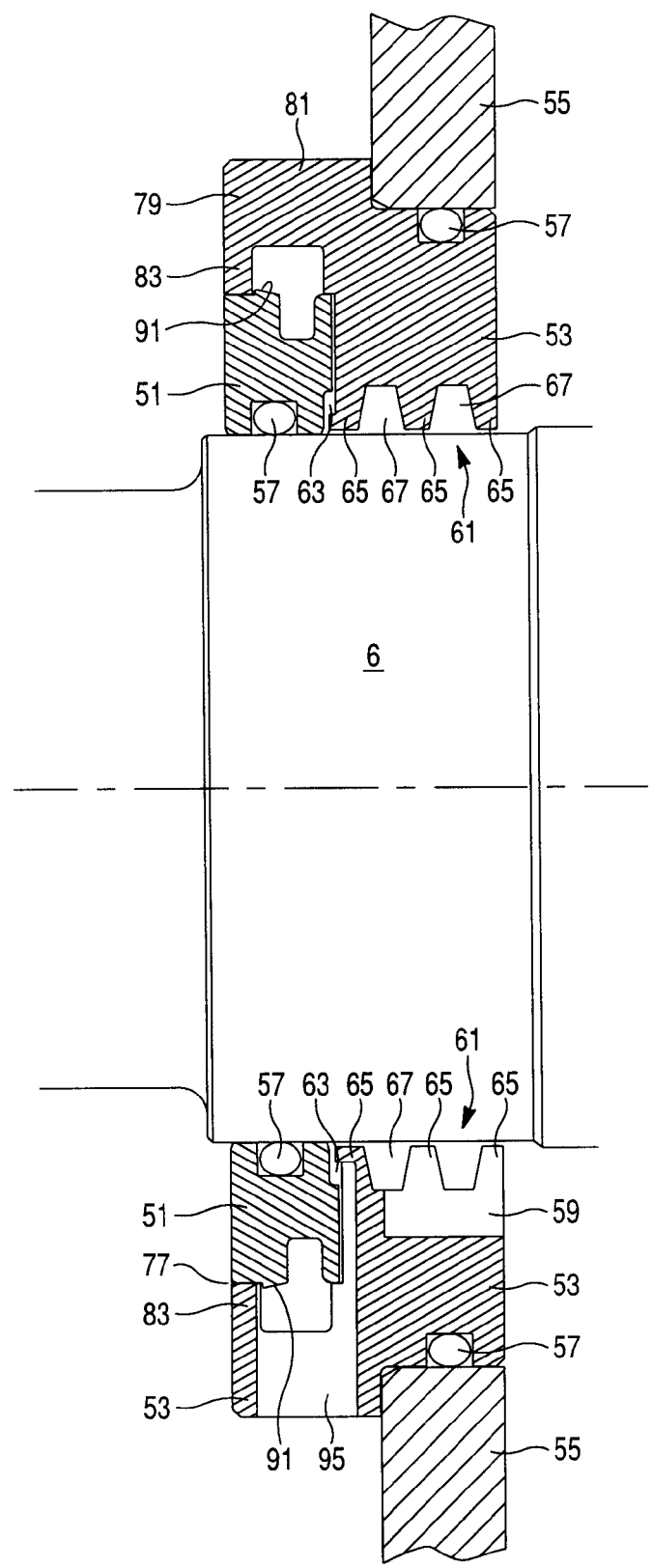
FIG. 2 is a cross-sectional view of a labyrinth sealing assembly in accordance with a preferred embodiment of this invention, with the sealing assembly being illustrated in a cross-sectional manner, and the pump shaft being illustrated in an elevational manner.

Referring to FIG. 2, the labyrinth seal for sealing the bearing housing includes rotating member or rotor 51, stationary member or stator 53, pump frame 55, rubber or other resilient O-rings 57 for keeping the adjacent elements in place relative to one another, linear drainage groove 59 at the bottom or six o'clock position of stator 53, labyrinth sealing area 61 defined between stator 53 and rotating pump shaft 6, and another sealing area 77 defined between the adjacent axially extending faces of stator 53 and rotor 51. An annular radial trap 63 is defined in an area between radially extending faces of the stator and rotor. Each of stator 53 and rotor 51 are annular in design that they extend all the way around pump shaft 6. The presence of shaft 6 in FIG. 2 enables only the top and bottom cross-sectional portions of the sealing device to be shown.

Labyrinth sealing area 61 includes a plurality (e.g. 3) of land members 65 and one or a plurality (e.g. 2) of groove areas 67 extending between lands 65. The land 65 closest to rotor 51 functions as both the land and labyrinth sealing assembly 61 between the stator and the shaft. A radially extending side of this land member also helps define radial trap or notch 63. Radial trap 63 enhances performance of the seal while it is static (not rotating). Trap 63 or notch is an annular groove surrounding shaft 6, and is defined between rotating rotor 51 and stationary stator 53.

A portion of this groove 63 is formed by a cutout or recess 71 (see FIG. 3) in the radial face of stationary member 53, and the other portion of this groove is formed by a cutout or recess 73 (see FIG. 3) in the face of rotating rotor member 51. Alternatively, groove or trap 63 may be formed by a cutout or notch in only one of members 51 and 53.

Any contamination which traverses radially inward through the tight clearance between radial faces of these parts 51 and 53 will enter radial trap groove area 63. Since trap groove area 63 is much wider and thus has a greater clearance than the adjacent space between the faces of 51 and 53, the path of least resistance for this contamination becomes annular trap or groove 63 which directs the contamination circumferentially around shaft 6 to the bottom or six o'clock position of the assembly where it simply drains back out, through drainage notch, aperture or cutout 95 defined in 53.

Figure 3:
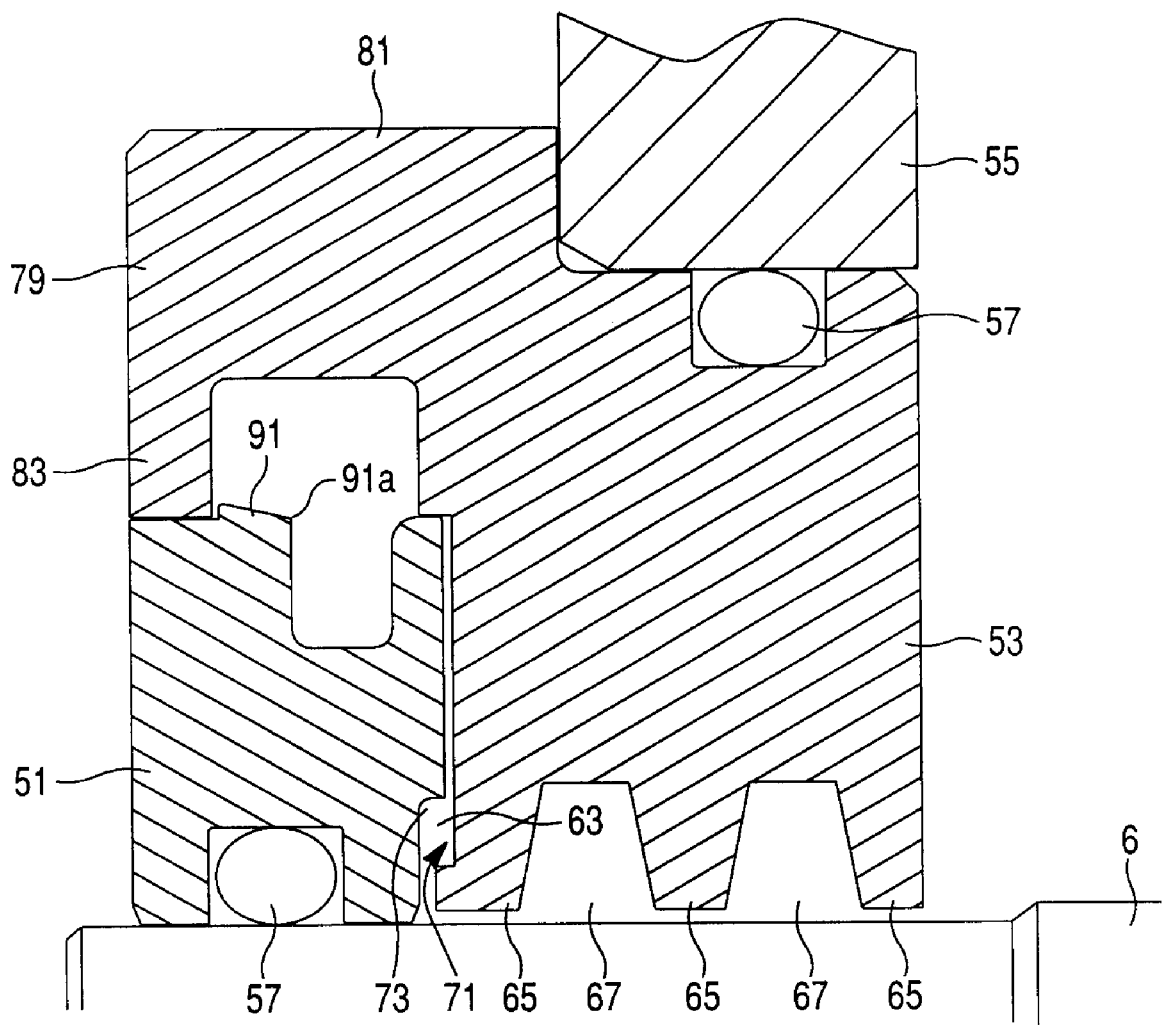
FIG. 3 is an enlarged cross-sectional view of the upper half of the embodiment of FIG. 2.

The seal of the FIGS. 2–3 embodiment does not require any type of heat processing for assembly in order to engage the rotor and stator, although same is possible in alternative embodiments. Accordingly, the method of assembling the instant labyrinth seal assembly enables reduced manufacturing costs and more simplicity.

As mentioned above, certain prior art labyrinth sealing devices have a rotating member which extends all the way to the outer extremities of the seal. This is dangerous. The instant invention, as shown in FIG. 2, includes a stationary covering or shroud 79, which forms part of the stator 53, that covers the outer surface of rotating member 51 thereby making maintenance personnel less susceptible to injury. Stator 53 includes a main body illustrated below pump frame 55. From this main body, shroud or cover 79 extends outwardly by way of axially extending portion 81. Shroud 79 further includes a radially inwardly extending portion 83 which forms a rotating sealing assembly 77 with an axially extending surface of rotor 51. The space or sealing assembly 77 between the radially outer surface of rotor 51 and the radially inward surface of member 83 may have a tight clearance, or alternatively may be spaced apart further than other labyrinth sealing surfaces of the seal system.

According to certain embodiments of this invention, any direct rubbing of grooved surfaces is minimized or substantially eliminated during assembly and otherwise, thereby eliminating prior art problems of scraping of material from rotating surfaces. Thus, potential generation of fine powder from such scraping is reduced or substantially eliminated.

Rotor 51 is held in place during pump operation, relative to stator 53, due to the provision of projection 91 on rotor 51. Projection extends radially outward from a surface of rotor 51. As illustrated in FIGS. 2 and 3, the radially outward surface of projection 91 is angled relative to the horizontal at an angle of from about 2–40° (preferably from about 5–25°). The angled surface slopes toward the main body of stator 53 such that its leading edge 91 a defines an outer minimal diameter that is less than the inner diameter of the radially inwardly extending portion 81, to aid in the assembly of the seal assembly. During assembly, the stator 53 and rotor 51 are interconnected. with the two snapping together when radially inwardly extending portion 83 of the stator 53 snaps over top of projection 91 and comes to rest in the position illustrated in FIGS. 2 and 3. The radially extending face of projection 91, that faces portion 83, keeps rotor 51 and stator 53 located relative to one another during pump operation as illustrated in FIGS. 2 and 3.

With regard to drainage, stator 53 includes a single axially extending groove 59 defined therein adjacent areas 67. Groove 59 is preferably positioned at the bottom or six o'clock position of the stator 53. Thus, drainage is permitted from groove(s) 67 by way of drainage groove 59 in order to promote maximum fluid flow back toward the interior of the bearing housing. Stator 53 may have, in certain embodiments, another drainage groove 95 or aperture defined therein which is in fluid communication with groove or trap 63. Drainage groove or aperture 95 enables contaminants caught in trap 63 to drain out of or leave the sealing assembly. Groove 95 may be a simple hole, a groove, a notch, or any other type of aperture which enables drainage of contaminants.

In view of the above, when the pump motor drives shaft 6, rotor 51 rotates therewith while stator 53 remains stationary. Land members 65 remain stationary so that a labyrinth seal is formed between the land members and the outer peripheral surface of shaft 6. Land member 65 and groove 67 work together to form this labyrinth type seal. This seal prevents contaminants from entering or leaving the bearing housing in certain embodiments.

With reference to FIG. 2–3, it is noted that stator 53 includes a first portion adjacent frame 55 having a first outer diameter, and a second portion including cover 79 that has a second outer diameter. The second outer diameter is substantially larger than the first diameter. The bearing housing 41 and oil lubrication chamber 42 are located adjacent the part of the stator 53 having the first, or smaller diameter. This is the case for seals 25 and 29. Thus, seal 25 is a mirror image of seal 29, in certain embodiments.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A combination labyrinth seal assembly and in a centrifugal pump, the labyrinth seal assembly comprising:

a stationary stator surrounding a pump shaft defining an axial direction, the stator being annular in shape and having an inner opening defined therein through which the pump shaft extends, the stator including a plurality of land and groove portions on an inner periphery thereof for forming a labyrinth seal between the stator and an outer periphery of the pump shaft;

a rotor which is annular in shape, the rotor mounted on the pump shaft for rotation therewith and the rotor being located adjacent the stator, said rotor including a circumferential cup-shaped groove defining a minimal outer periphery of said rotor;

the stator including a shroud portion which extends over top of an outer peripheral portion of the rotor in order to cover same and is offset from said outer peripheral portion to form an open area between said shroud portion and said outer peripheral portion in a radial direction, said shroud portion further comprising a radially inwardly facing surface; and the outer peripheral portion of the rotor including at least one angled surface for aiding assembly of the labyrinth seal, said angled surface having a leading edge defining a minimal diameter of said angled surface which extends in a radially outward direction, wherein at least one radially inwardly extending portion of the shroud contacts and slips over top of the angled surface during labyrinth seal assembly, with the at least one radially inwardly extending portion of the shroud coming to rest in a final assembled position in a location such that the shroud does not contact the angled surface during operation of the pump, said minimal diameter being less than an inner diameter of said at least one radially inwardly extending portion to aid in labyrinth seal assembly, wherein said radially inwardly facing surface of said shroud faces said open area and extends fully across said angled surface and said circumferential cup-shaped groove parallel to said axial direction.

2. The labyrinth seal assembly of claim 1, wherein the angled surface on the outer periphery of the rotor protrudes radially outward from an adjacent portion of the outer periphery of the rotor so as to form a wall which extends radially outward from the center of the pump shaft, and wherein said wall helps to maintain the rotor and stator in a final assembled position and operative relation during operation of the pump and helps to maintain the stator and rotor in proper position relative to one another during pump operation.

3. The labyrinth seal assembly of claim 1, wherein said at least one angled surface defines an angle of from about 2–40° relative to a horizontal axis that is parallel to a longitudinal axis of the pump shaft.

4. The labyrinth seal assembly of claim 3, wherein said at least one angled surface defines an angle of from about 5–25° relative to said horizontal axis.

5. The labyrinth seal assembly of claim 1, wherein said stator includes at least one axially extending groove defined therein for drainage purposes.

* * * * *